Patented Sept. 26, 1933

1,928,132

UNITED STATES PATENT OFFICE 1,928,132

PROCESS FOR PURIFYING LIQUIDS

Sylvan R. Merley, Dover, N. J. assignor to Doherty Research Company, New York, N. Y., a corporation of Delaware No Drawing. Application August 17, 1928
Serial No. 300,395

5 Claims. (Cl. 202—41)

This invention relates to a process for purifying liquids. More particularly it relates to a distillation process for treating organic liquids by which they are purified of undesirable constituents which ordinarily may not be separated therefrom by distillation.

In the manufacture of alcohols and esters, as well as other compounds, from cracking still gases or light gasoline hydrocarbons containing unsaturated hydrocarbons it is the usual procedure to treat the material containing such hydrocarbons with concentrated sulphuric acid in order to absorb the olefins or other unsaturated hydrocarbons corresponding to the various alcohols or other compounds to be produced. After the sulphuric acid is saturated or partially saturated, it is then diluted with water in order to convert the absorbed material into alcohols, such for example as isopropyl alcohol, secondary butyl alcohol, secondary amyl alcohol, and other higher alcohols. This mixture of alcohols is more or less contaminated with hydrocarbons such as the aliphatic hydrocarbons contained in the materials treated, and also polymerized unsaturated hydrocarbons produced from simple unsaturated hydrocarbons by the action of the concentrated acid. When this mixture of alcohols is distilled and fractionated, each fraction will be contaminated with certain of the hydrocarbons or polymers which boil at the same temperature as the particular alcohol fraction.

The same conditions result in the manufacture of organic compounds containing oxygen such as acids, aldehydes, alcohols, ketones and esters, by the controlled oxidation of hydrocarbon gases or liquids or in the fermentation processes for the manufacture of alcohols. Furthermore in the commercial preparation of organic esters from alcohols and acids, pure compounds are seldom used and therefore the ester product usually contains undesirable impurities or other esters which cannot be completely removed by rectification.

Therefore the primary object of the present invention is to provide a commercial process for the purification of individual organic compounds in an efficient and economical manner.

With this object in view the process comprises the treatment of organic compounds by a distillation procedure wherein advantage is taken of the "spread" between the "dry" distillation temperature and the "wet" distillation temperature of the compound to be purified in order to free the same of the impurities contained therein.

Other objects and advantages of the invention will be apparent from the following detailed description of the process in connection with certain specific examples.

Isopropyl acetate is an important commercial solvent which distills dry at 89° C., and distills with about 6% water at about 76° C. This ester is now produced in considerable quantity along with other esters (acetates) from cracking still gases containing unsaturated hydrocarbons. The process comprises the absorption of the unsaturated compounds in sulfuric acid to yield a substantially saturated acid mixture containing a series of alkyl sulfates corresponding to the compounds absorbed. This mixture is then mixed with a quantity of hydrocarbon oil (such as kerosene) and while it is maintained at a temperature of about 70° C., a suitable quantity of dry commercial calcium acetate is added through the oil layer. The calcium acetate is gradually incorporated into the mixture by suitable mixing equipment after which the temperature is raised to a point not to exceed about 90° C. at which point an esterification replacement reaction takes place by which the alkyl sulphates are converted into alkyl acetates.

After the reaction is complete the mixture is cooled and allowed to stratify, the upper oily layer comprising the oil and esters being drawn off. The residue after being washed free of esters with additional oil may be discarded since it consists mainly of solid calcium sulphate with some occluded sulphuric acid. The oily layer containing the isopropyl acetate and other esters is subjected to fractional distillation in order to eliminate the oil and obtain the various esters as fractions.

Under ordinary circumstances these ester fractions have been subjected to repeated dry rectifications in an attempt to eliminate various materials such as hydrocarbons, olefine, polymers, mercaptans and other impurities which distill in the same temperature range as the ester fraction, but such attempts at purification have been unsuccessful. An isopropyl acetate fraction for example even after several distillations will still have a distinct yellow color and an unnatural odor.

In accordance with the present invention it has been found that the ester fractions obtained in the manner described above may be obtained as clear water-white liquids and free of mercaptans and other impurities which give a disagreeable odor. Taking for example the crude isopropyl acetate fraction as separated in the fractional distillation, it is first rectified so as to bring it within the desired distilling range at about 89° C. (The "tops" and bottoms may be run to a crude tank to be mixed with the next crude batch). This fraction will contain various impurities which normally boil in the range selected or which when mixed with isopropyl acetate (as a binary mixture) boil in that range. In order to eliminate these impurities the fraction is mixed with water and rectified or steam rectified in a suitable column. This steam distillation is conducted under normal pressure and a definite fraction is cut and taken over within a suitable temperature range at about 76° C., at which temperature the isopropyl acetate steam distills. The previous distillations were carried out in the absence of water, (dry distillation of the crude ester fractions is necessary because of the presence of organic acid, which with water would cause the hydrolysis of the ester) so that under the conditions of the steam distillation some of the impurities such as unsaturated polymers will come over at a temperature below 76° C., while other impurities will remain behind in the still as a residue.

The isopropyl acetate fraction as obtained by the steam rectification may still be contaminated with an impurity which would form a ternary mixture with water and isopropyl acetate and come over in the range at 76° C. The fraction is therefore dried and thereafter finally rectified dry so that the purified fraction will be collected in the 89° C. range. The "tops" and "bottoms" of this final distillation may be run to the crude isopropyl acetate tank.

In this series of alternate "dry" and "wet" distillations advantage is taken of the "spread" or difference between the boiling temperature of isopropyl acetate when "dry" and that when "wet" to effect its purification. The other acetate fractions may be purified in the same way.

The following is a list of alcohols and esters together with the temperatures at which they distill "wet" and "dry". It will be noted that in any group the "spread" increases more or less regularly as the molecular weight of the compounds increases.

|  | Boiling temperatures | | "Spread" |
|---|---|---|---|
|  | Wet | Dry |  |
| Secondary butyl alcohol | 87.5° C. | 99.4° C. | 11.9° C. |
| Secondary amyl alcohol | 92.1° | 119.2° | 27.1° |
| Secondary hexyl alcohol | 95° | 139° | 44° |
| Secondary butyl acetate | 86.5° | 110° to 112° | 23.5° |
| Secondary amyl acetate | 92.3° | 133° to 134° | 40.7° |
| Isopropyl propionate | 85.8° | 109° to 110° | 23.2° |
| Secondary butyl propionate | 92.4° | 131.6° | 39.2° |
| Secondary amyl propionate | 95.6° | 153.3° | 57.7° |
| Secondary hexyl propionate | 97.9° | 173.4° | 75.5° |
| Isopropyl butyrate | 92.3° | 131.8° | 39.5° |
| Secondary butyl butyrate | 95.8° | 153.4° | 57.6° |
| Secondary amyl butyrate | 79.6° | 173.2° | 93.6° |

Both the "wet" and "dry" distillations of the materials referred to in the above list were carried out at substantially atmospheric pressure under conditions such that the ratio of water was substantially constant for each substance. In the specific example describing the distillation of isopropyl acetate the amount of water during the wet distillation represented about 6% of the total vapors carried over. The temperature differences between the "wet" and "dry" distillations may of course be made considerably greater by carrying out the "wet" or steam distillation under a reduced vapor pressure and with a greater percentage of water, but such processes are inefficient because the time of distillation is materially lengthened.

In the procedure described above in connection with the particular method of manufacturing esters the first distillation of the purifying process was of necessity a "dry" distillation, but the order of the successive distillations is unimportant and only depends on the condition in which the fraction is first obtained. For example the secondary butyl alcohol in the above list is produced on a commercial scale by diluting with water a batch of alkyl sulphates obtained from cracked petroleum gases in the manner referred to above.

This dilution gives a mixture of alcohols, in the presence of dilute sulphuric acid and various hydrocarbon and polymer impurities which were present in the batch of alkyl sulphates. From this dilution mixture the alcohols are recovered as crude fractions by fractional distillation from the mixture, the secondary butyl alcohol fraction being cut between about 84° and 87.5° C. This crude fraction as collected will contain besides the butyl alcohol small amounts of isopropyl and amyl alcohols, saturated and unsaturated hydrocarbons, hydrocarbon polymers some of which contain sulphur and from 20 to 23% water. The fraction is next dried in any convenient manner and then subjected to a dry rectification in which the cut coming over between 95 and 100° C. is collected as the semi-refined secondary butyl alcohol. This dry distillation will eliminate, either as tops or bottoms, the isopropyl and amyl alcohols as well as the greater portion of the hydrocarbons and polymers. In order to remove the remainder of the impurities the fraction is again fractionally distilled in the presence of water (or steam) in which the new fraction is cut at about 86.5 to 87.5° C., dried and rectified dry, the final purified fraction being taken at about 98 to 99.5° C. The secondary butyl alcohol obtained by this process is water white and free from foreign odors.

While various methods may be used for drying the alcohols and other compounds treated, it is preferred to use a water stripping process in which the wet compound is mixed with a polymer water remover and then subjected to distillation and rectification. It has been found that a light polymer mixture boiling between 50° and 70° C., produced in the treatment of unsaturated hydrocarbons with sulphuric acid, has the unusual property of carrying over the water at a much lower temperature than the compound distills. This drying process is particularly advantageous where the compound forms a constant boiling mixture with water.

In previous processes it has been the general practice that once a fraction is dried or obtained dry it is never redistilled with water, but the degree of purification obtained in any case is usually by repeated dry rectifications which will not remove the impurities of the type referred to which distill at the same or about the same temperature as the desired product.

Where the phrase "organic compound containing oxygen" is used in the specification and claims it is to be understood as including compounds containing combined oxygen as in organic acids, esters, aldehydes, ketones or alcohols.

Having described the invention in its preferred form what is claimed as new is:

1. The process of purifying organic esters from impurities boiling at about the same temperature as the esters, which comprises rectifying the ester to be purified in the absence of water to separate the ester from impurities having a boiling point differing from that of the ester, then redistilling said ester with a substantially constant proportion of water at substantially atmospheric pressure to separate the ester from the impurities which distilled therewith in the first distillation, and thereafter drying said ester.

2. In the process of purifying organic esters mixed with impurities boiling at substantially the same temperature as the esters in which an organic ester is distilled and rectified in the absence of water, the improvement which comprises redistilling said ester in the presence of water and at substantially lower temperature thereby to isolate the ester from any impurities which distilled with said ester in the previous distillation, and thereafter drying said ester.

3. In the process of purifying organic esters mixed with impurities boiling at substantially the same temperature as the esters in which an organic ester fraction is distilled under substantially anhydrous conditions, the improvement which comprises redistilling the said fraction in the presence of water thereby to effect distillation at a lower temperature and thus separate the fraction from the impurities which distilled therewith in the first distillation, and thereafter drying said fraction.

4. The process of purifying individual organic liquid compounds manufactured from fluid material containing a mixture of unsaturated hydrocarbons, which comprises subjecting the compound to be purified with which is mixed impurities boiling at substantially the same temperature as said compound, to successive distillations in one of which the compound is rectified under substantially anhydrous conditions at its normal boiling point and in the other of which it is distilled with water at a considerably lower temperature thereby to isolate the compound from the impurities mixed therewith.

5. The process of purifying organic compounds containing oxygen manufactured from hydrocarbons by partial oxidation or by sulfation with subsequent hydrolysis or substitution, which comprises distilling such an organic compound to separate it and hydrocarbon and polymer impurities which distil with said compound at its distilling temperature from constituents of the crude reaction mixture in which it is formed, redistilling the resulting distillation mixture containing said compound and the said impurities which distilled therewith and rectifying the resulting vapors to separate the compound from said impurities, conducting one of said distillations with water as a component in the mixture being distilled and conducting the other distillation in the substantial absence of water, whereby said compound is separated from the impurities which distilled therewith in the first-mentioned distillation.

SYLVAN R. MERLEY.